(12) United States Patent
Rousu et al.

(10) Patent No.: US 9,544,011 B2
(45) Date of Patent: *Jan. 10, 2017

(54) METHODS, DEVICES, AND COMPUTER PROGRAM PRODUCTS IMPROVING MOBILE COMMUNICATION

(71) Applicant: Broadcom Corporation, Irvine, CA (US)

(72) Inventors: Seppo Olavi Rousu, Oulu (FI); Samuel Vehkalahti, Haukipudas (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,618

(22) Filed: Feb. 9, 2016

(65) Prior Publication Data

US 2016/0164567 A1 Jun. 9, 2016

Related U.S. Application Data

(63) Continuation of application No. 14/056,341, filed on Oct. 17, 2013, now Pat. No. 9,294,182.

(30) Foreign Application Priority Data

Oct. 19, 2012 (GB) .................................. 1218865.2
Oct. 23, 2012 (GB) .................................. 1219039.3

(51) Int. Cl.
*H04B 1/38* (2015.01)
*H04B 1/44* (2006.01)
(Continued)

(52) U.S. Cl.
CPC .................. *H04B 1/44* (2013.01); *H01Q 1/32* (2013.01); *H01Q 1/50* (2013.01); *H04B 7/0602* (2013.01); *H04B 7/082* (2013.01); *H04L 67/12* (2013.01)

(58) Field of Classification Search
CPC ....... H04B 7/0602; H04B 7/082; H04B 7/061; H04B 7/12
(Continued)

(56) References Cited

U.S. PATENT DOCUMENTS 6,128,476 A * 10/2000 Fujita ..................... H04B 7/082
375/299
6,163,303 A * 12/2000 Nagy ................... H01Q 1/1278
343/704
(Continued)

FOREIGN PATENT DOCUMENTS

EP 0998056 A2 5/2000
GB 2323750 A 9/1998
(Continued)

*Primary Examiner* — Edward Urban
*Assistant Examiner* — Max Mathew
(74) *Attorney, Agent, or Firm* — Oblon, McClelland, Maier & Neustadt, L.L.P.

(57) ABSTRACT

A system for use in a mobile device comprises: a switch unit configured to switch a common connection of a transmitter and a first receiver from a first antenna to a second antenna and a connection of a second receiver from the second antenna to the first antenna; and a processing system configured to receive at least two reception signals from the first and second receivers; in response to receiving the two reception signals, evaluate a communication link via the first and second antennae; based on the evaluation of the communication link, determine that the transmitter needs to transmit via the second antenna; obtain reception parameters used by said first and second receivers; cause the switch unit to switch the common connection of the transmitter and a first receiver so that the transmitter transmits via the second
(Continued)

antenna; and exchange reception parameters between the at least two receivers.

18 Claims, 4 Drawing Sheets

(51) Int. Cl.
  *H04B 7/08* (2006.01)
  *H04B 7/06* (2006.01)
  *H01Q 1/32* (2006.01)
  *H01Q 1/50* (2006.01)
  *H04L 29/08* (2006.01)

(58) Field of Classification Search
  USPC .......................................... 455/73; 375/260
  See application file for complete search history.

(56) References Cited

U.S. PATENT DOCUMENTS

| | | | | |
|---|---|---|---|---|
| 6,281,840 B1* | 8/2001 | Miyoshi | ............... | H04B 7/0608 342/373 |
| 8,331,478 B2* | 12/2012 | Harrison | ............... | H04B 7/0678 341/173 |
| 8,509,707 B2* | 8/2013 | Rofougaran | ............ | A63F 13/06 330/129 |
| 8,843,084 B2* | 9/2014 | Pescod | .................... | H01Q 1/273 455/101 |
| 8,867,591 B2* | 10/2014 | Rofougaran | ........... | H04B 1/001 375/219 |
| 2003/0096617 A1* | 5/2003 | Miller, II | .............. | H04B 7/0822 455/452.1 |
| 2007/0107020 A1* | 5/2007 | Tavares | ................ | H04W 72/082 725/81 |
| 2008/0102752 A1 | 5/2008 | Lee | | |
| 2010/0329370 A1* | 12/2010 | Hochwald | ............ | H04B 7/0671 375/260 |
| 2012/0219040 A1* | 8/2012 | Valentine | ............. | H04B 7/0871 375/219 |
| 2013/0128832 A1* | 5/2013 | Kang | .................. | H04W 72/042 370/329 |
| 2014/0105079 A1* | 4/2014 | Bengtsson | ............. | H04B 1/005 370/297 |
| 2015/0349409 A1* | 12/2015 | Imamura | .............. | H01Q 1/3275 343/713 |

FOREIGN PATENT DOCUMENTS

| | | |
|---|---|---|
| JP | 2001148645 A | 5/2001 |
| WO | 2011/095796 A2 | 8/2011 |

* cited by examiner

METHODS, DEVICES, AND COMPUTER PROGRAM PRODUCTS IMPROVING MOBILE COMMUNICATION

CROSS-REFERENCE TO RELATED APPLICATIONS

This application is a continuation of U.S. application Ser. No. 14/056,341, filed Oct. 17, 2013, which claims the benefit under 35 U.S.C. §119(a) and 37 CFR §1.55 to UK Patent Application No. GB 1219039.3, filed on Oct. 23, 2012 and to UK Patent Application No. GB 1218865.2, filed on Oct. 19, 2012, the entire contents of both of which are incorporated herein by reference.

TECHNICAL FIELD

The present invention relates to devices, methods and computer program products in relation to mobile communication. In particular, it relates to those devices, methods and computer program products utilising two or more antennae for diversity receiving purposes.

BACKGROUND

Mobile communication architectures can be categorized as cellular network and ad-hoc network. In a cellular network such as Long Term Evolution (LTE), LTE-Advanced (LTE_A), Universal Mobile Telecommunications System (UMTS), Global System for Mobile Communications (GSM), or the like, communication between mobile devices is routed via one or more core network elements. Contrary, in ad-hoc networks, mobile devices can communicate directly with each other without involving a (core) network structure such as a centralized controller.

In urban environments, multipath and large angular spread leads to multipath propagated signals reception. On the other hand, in a rural environment with line of sight condition, diversity/Multi Input Multi Output (MIMO) reception of the mobile device based on reception via two or more antennae, each connected with a diversity receiver, may allow a receiving communication even with a radio link with reduced performance. A transmitter is usually operatively bound to one of the diversity receivers. However, if the base station is poorly positioned in relation to the antennae of the mobile device, a transmitting communication link may not be possible, mobile device may drop call, or the communication link may be not optimal. This may lead not only to transmission defects but also to complete communication defects.

Hence it is an object of the invention to improve mobile communication.

SUMMARY

In a first exemplary embodiment of the invention, there is an apparatus for use in a mobile device, the apparatus comprising: a switch unit configured to switch a common connection of a transmitter and a first receiver from a first antenna to a second antenna and a connection of a second receiver from the second antenna to the first antenna; and a processing system configured to receive at least two reception signals from the first and the second receivers; in response to receiving the at least two reception signals, evaluate a communication link via the first and the second antennae; based on the evaluation of the communication link, determine that the transmitter needs to transmit via the second antenna; obtain reception parameters used by said first and said second receivers; cause the switch unit to switch the common connection of the transmitter and the first receiver so that the transmitter transmits via the second antenna or is connected with the second antenna; and exchange reception parameters between the at least two receivers.

In a second exemplary embodiment of the invention, there is a device, comprising: a transceiver; at least two receivers; at least two antennae; and an apparatus according to the first exemplary embodiment.

In a third exemplary embodiment of the invention, there is a method, comprising: switching a common connection of a transmitter and a first receiver from a first antenna to a second antenna and a connection of a second receiver from the second antenna to the first antenna by a switch unit; receiving at least two reception signals from the first and the second receivers; in response to receiving of the at least two reception signals; evaluating a communication link via the first and the second antennae; based on the evaluation of the communication link, determining that the transmitter needs to transmit via the second antenna; obtaining reception parameters used by said first and said second receivers; causing the switch unit to switch the common connection of the transmitter and the first receiver so that the transmitter transmits via the second antenna; and exchanging reception parameters between the at least two receivers.

In a fourth exemplary embodiment of the invention, there is a non-transitory computer-readable storage medium comprising a set of computer-readable instructions stored thereon, which, when executed by a device, cause the device to perform the steps of: switching a common connection of a transmitter and a first receiver from a first antenna to a second antenna and a connection of a second receiver from the second antenna to the first antenna by a switch unit; receiving at least two reception signals from the first and the second receivers; in response to receiving of the at least two reception signals, evaluating a communication link via the first and the second antennae; based on the evaluation of the communication link, deciding that the transmitter needs to transmit via the second antenna; obtaining reception parameters used by said first and said second receivers; causing the switch unit to switch the common connection of the transmitter and the first receiver so that the transmitter transmits via the second antenna; and exchanging reception parameters between the at least two receivers.

Various further aspects of at least some exemplary embodiments of the aspects of the invention are set out in the respective dependent claims.

Some aspects of the invention provide the advantage that a present hardware (HW) implementation of the mobile device can be widely maintained so that additional cost for the higher performance implementation solution can be avoided. Moreover, a platform radio frequency (RF) front end can be used as such for connecting by adding a double pole double throw (DPDT) switch. Advantageously, embodiments may be implemented by software adaptation at the modem side of the mobile device.

It should especially be noted that the invention is not limited to two antennae. If more than two antennae are provided, switching of the transmitter and a corresponding first diversity/MIMO receiver to an appropriate antenna may be followed by a further selection of an appropriate antenna of the further antennae for being connected with a second diversity/MIMO receiver.

Although embodiments of the invention will be explained exemplary in the following with reference to vehicle-mounting, the invention is not restricted to vehicle-mounting but may also be applied to other mobile devices as will become apparent from the description of the embodiments.

BRIEF DESCRIPTION OF THE DRAWINGS

The teachings of the present invention can be readily understood and at least some additional specific details will appear by considering the following detailed description of at least some exemplary embodiments in conjunction with the accompanying drawings, in which.

DETAILED DESCRIPTION

Without limiting the scope of the invention to the embodiments, embodiments of the invention are illustrated in more detail by the following description referring to the accompanying drawings. Indeed, references to certain standards, media and/or resources in this description are supposed to be exemplary for the purpose of illustration of the invention in order to improve the ease of understanding of the invention. They are not to be understood as limiting the inventive concept. Likewise, the language as well as terms used herein such as e. g. signal names, device names and the like, are to demonstrate the embodiments only. Use of such language or terms apart from their understanding according to this disclosure shall not be applied to the invention for the purpose of limiting its scope.

Generally, mobile devices may be user equipments (UE) such as cellular phones, smart phones, laptops, handhelds, tablets, or the like. A mobile device may also be a module which can be connected to or inserted in a user equipment. The term "mobile device" can also encompass objects that are mobile, such as vehicles.

Although wireless communication is usually established via radio as a transmission resource, it may also be applied to ultrasonic, infrared light or the like as transmission resource.

Herein below, however, exemplary aspects of the invention will be described with reference to radio communication as wireless communication medium.

One application domain in particular, namely a vehicle, is challenging from the point of view of antenna configuration. The constraints of other wireless communication environments may also present challenges, such as those of cellular phones, tablets, laptops, buildings, or the like.

In relation to a vehicle such as a car, the roof of the car is typically the most desired place for an antenna arrangement, since this location may provide for omnidirectional radiation pattern. Omnidirectional radiation pattern of such antennae is desired because, during movement of the mobile device, a communication link to a certain base station of the core network, which is usually stationary, may vary, especially, in view of direction. An omnidirectional radiation pattern of an antenna may allow nearly independence from direction.

However, this location usually brings with it an undesired impact to industrial car design. Often, any additional overhang, especially on the roof, will look awkward. Therefore, technology related to antennae is supposed to be invisible for customers and hidden into an industrial design.

Figure 1:
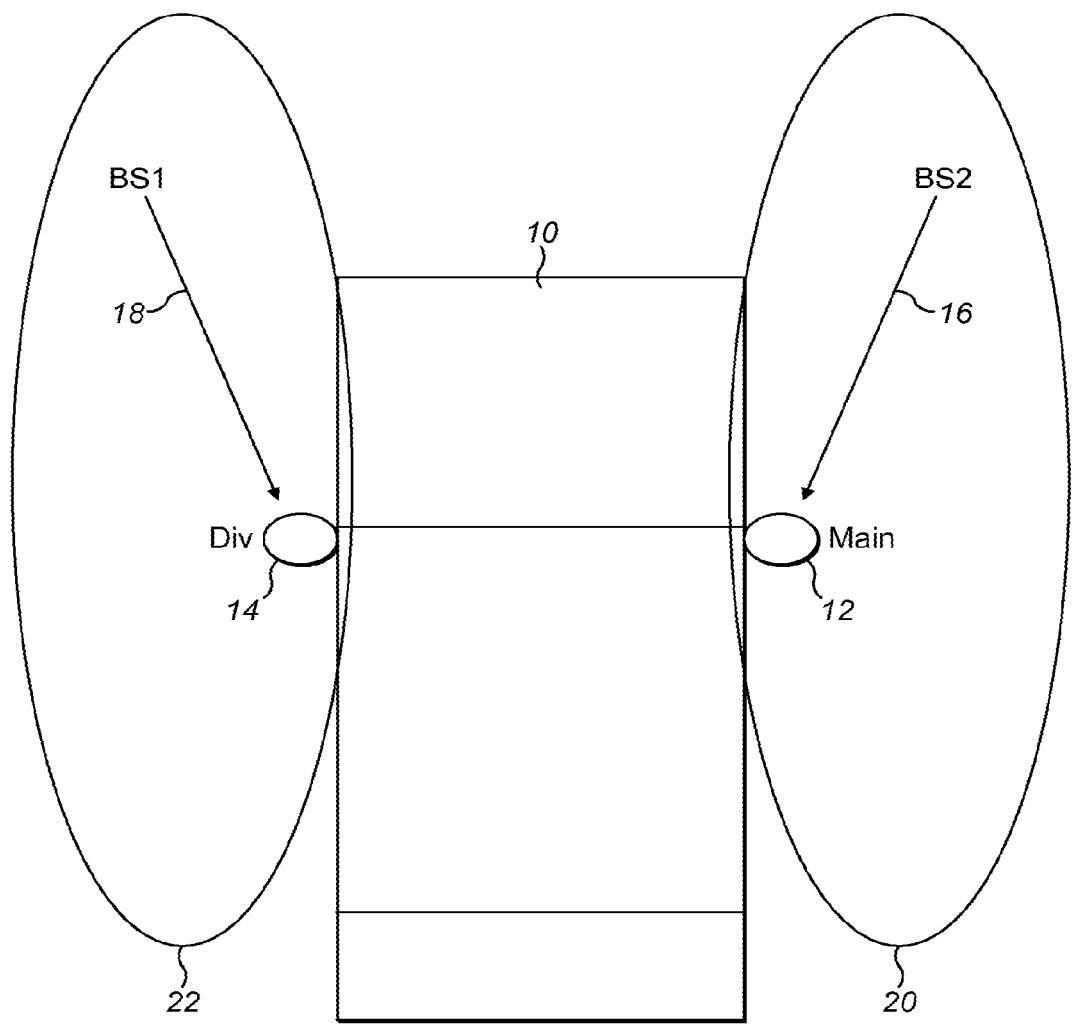
FIG. 1 schematically shows a vehicle having two antennae each located in its side mirrors.

To address the issues associated with car design, the antenna may be provided as two antennae, each located at each of two opposite side mirrors of the car so as to reduce the effect related to the car industrial design, as shown in FIG. 1. Unfortunately, this arrangement results in a limited antenna radiation pattern, as will become apparent from the following discussion.

FIG. 1 depicts a vehicle 10 having two side mirrors 12, 14 arranged at opposite sides of the vehicle 10. One side mirror, the side mirror 12 on the right side of the vehicle 10, has an antenna designated as "main", which is used for receiving and transmitting purposes. The second antenna of mirror 14 on the left side of the vehicle 10 is used for receiving purposes only and is designated as "div". Both antennae are integrally formed with the corresponding mirrors or mirror housings 12, 14 or other assembly part of apparatus. E. g., the antennae can be in embedded in a silver layer of the mirrors or the like. Processing of the receiving signals of both of the antennae establishes diversity and/or MIMO reception in view of the receiving communication link or downlink (DL), respectively.

Each of the antennae in the mirrors 12, 14 has a certain communication range 20, 22 caused by a limited antenna radiation pattern. E. g., a receiving signal 18 (BS1 radio tower) transmitted from a first base station, not shown, is received by the antenna of the mirror 14 and by the antenna of the mirror 12. A receiving signal 16 (BS2 radio tower) transmitted from a second base station not shown, is received by the antenna of the mirror 12 and by the antenna of the mirror 14. In this arrangement, each of the antennae, main and div, is connected via a connection with a corresponding diversity receiver. For instance, a single BTS signal may be received by two or more MIMO receivers. Moreover, signals may be sent from two BTS towers and received with two or more antennae. The transceiver/receiver may have a communication link simultaneously to one or more base station radio towers. Operation is preferably adapted to allow receiving signals (RX) over one or both of the antennae main, div.

Generally, the receivers, (hereinafter referred to as first and second receivers) can be MIMO receivers or diversity receivers. The term diversity receiver such as for e. g. the 2G, 3G standard is used for a receiver capable of receiving single signal for DL during signal fading conditions to improve single signal reception. The term MIMO receiver (LTE™, LTE-A, WiFi™) is used to refer to a receiver capable of receiving multiple different data streams as a DL method to improve data throughput. Consequently, the MIMO receiver is adapted to operate in a MIMO communication system and employs reception of multiple signals (MIMO mode) whereas a diversity receiver is adapted to operate in a diversity mode in order to employ diversity reception. The first and the second receiver can also be adapted to operate in both modes, wherein the receivers can change their mode, preferably together, e. g. by switching between the modes, or the like. The connection may be preferably an electric connection such as an electric conductor, an electric line, an electric wire, or the like. The connection provides electric connection between those components electrically connected therewith.

Usually one transmitter (TX) is provided, which forms an integral unit with one of the diversity/MIMO receivers so as to form e.g. a transceiver. As a result, transmission of uplink communications is only possible via whichever antenna is actively connected to the transceiver. The integral unit, namely the transmitter and the corresponding first receiver may be connected with the antenna via a common connection. Under certain conditions a transmitting link may become disrupted and the overall communication link may be affected in an undesired way, while it may still be possible to receive data because of the diversity operation of the receivers.

In order to provide an improvement, embodiments provide a new scheme of antennae management of mobile devices in a communication network. In general embodiments relate to control of switching UL/DL diversity/MIMO antennae by a mobile device such as a user equipment UE. Each of the antennae can be used in a dual mode that it can be used for the purpose of transmission and reception. Antennae may share functionality of one or more other signals which may originate from one or more communication counterparts.

In a particular arrangement, information related to receiving, such as receiving parameters or the like, is used to enable a decision that a particular antenna is to be connected with the transmitter. Moreover, receiving information can be supplied to the transmitter and/or both of the diversity receivers, respectively, to enable substantially continuous data transmission and reception.

Under certain conditions, a single antenna such as a single side antenna of a car may be continuously operational due to dense network base stations and scattered fading environment with reflections. However, in rural areas, the data connection will drop if an UL antenna, that is, the antenna used for transmission, is continuously fixed at predefined side. Embodiments make use of this observation and propose that the TX antenna is switched according to uplink and/or downlink conditions.

In some embodiments, transmitter related information may trigger a swap of the antenna. Criteria for triggering antenna swap may include: that the highest transmitter power level was achieved; predefined highest power levels are used for a predefined time period; or the like. Alternatively, triggering may occur because UL quality is poor via the currently used antenna based on ACK/NACK feedback from BTS or a predefined amount of retransmission exceeded. Alternatively, triggering criteria may be any of transmitter-related information and/or receiver-related information, or any combination thereof.

In some arrangements, when the main receiver modem and diversity receiver modem antennae are swapped, the transmitter and both of the receivers are provided with corresponding information, such as certain parameters so that their operation can preferably be continued substantially without interruption or substantially without data throughput degradation.

Figure 4:
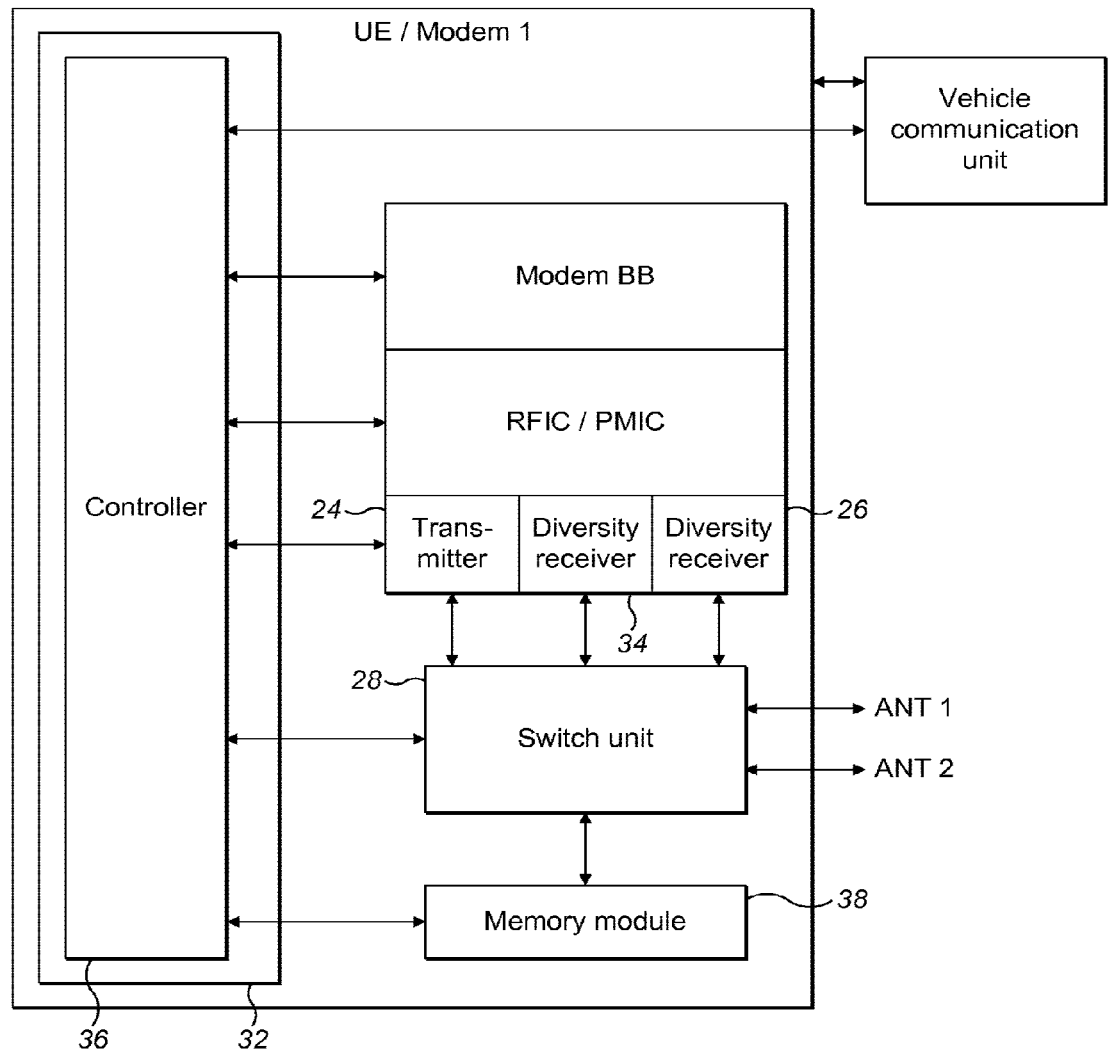
FIG. 4 shows a user equipment according to certain embodiments of the invention.

FIG. 4 shows an exemplary component configuration for implementing a transmission link (or transmission path) (TX) antenna swap between two antennae, namely, a main antenna (ANT 1) and a div antenna (ANT 2). The antenna ANT 1 may be located in right mirror or mirror housing 12 and the antenna ANT 2 may be located in left mirror or mirror housing 14 of the vehicles 10. Instead of mirror housing, the antennae may be located on any other kind of assembly part of the apparatus.

FIG. 4 shows a mobile device such as a user equipment UE that also may be referred to as modem1 and that may be arranged in the vehicle 10. The user equipment UE is in communication with a vehicle communication unit. As also depicted in FIG. 4, the user equipment UE comprises an apparatus 32. The apparatus 32 may be configured as a semiconductor chip, a hardware circuitry, a processing unit, combinations thereof, or the like. The apparatus 32 comprises a controller 36 which, in turn, communicates with a switch unit 28. Moreover, the user equipment UE comprises a transmitter 24 and a first diversity receiver 34 that are connected via a common connection and the switch unit 28 with the antenna ANT 1. The switch unit 28 may be a hardware switch such as DPDT or may be provided by a circuitry controlled by the controller 36. The switch unit 28 may be comprised by the controller 36 in order to form an integral unit with the controller 36, or it may be a separate component, as indicated in FIG. 4.

Moreover, a second diversity receiver 26 is provided by the user equipment UE which is also connected with the switch unit 28 via a connection. The antennae ANT 1 and ANT 2 are each connected with the switch unit 28 via a corresponding connection, and may be external to, or a composite part of the user equipment UE.

The switch unit 28 may be part of a controller 36 controlling at least the operation related to switching. Alternatively, the switch unit 28 may be connected to the controller 36. The controller 36 is in communication connection with a memory module 38. Likewise, the switch unit 28 is in communication connection with the memory module 38.

The user equipment UE further comprises a baseband modem (Modem BB) which is in communication with the controller 36. The user equipment UE also includes a Radio Frequency Integrated Circuit (RFIC) and a Power Management Integrated Circuit (PMIC), both in communication with the controller 36 and further operating with the transmitter 24, and the two diversity receivers 26, 34. In some embodiments, the controller 36 functionality may include a modem BB or other special purpose processor.

Although some of the before-mentioned modules and units are not part of the apparatus 32 of the user equipment UE (FIG. 4), the apparatus 32 may be adapted to comprise further units and modules such as the transmitter 24, the first and the second diversity receivers 34, 26, the memory module 38, the switch unit 28, and the like. In some embodiments, the user equipment UE may have two or more transmitters and two or more receivers, alternate modem receiver/s and transmitter/s, positioning receivers, alternate radio access technology and the like.

The switch unit 28 is interconnected between the transmitter 24 and the first diversity receiver 34 as well as the second diversity receiver 26, on the one hand, and the two antennae ANT 1 and ANT 2, on the other hand. The controller 36 causes the transmitter 24 and the first diversity receiver 34 to be switchably connected with one of the two antennae ANT 1 and ANT 2 and the second diversity receiver 26 to be switchably connected with another one of the two antennae ANT 1 and ANT 2. The controller 36 can have a switch unit 28 of the type double pole double throw DPDT suited for radio frequency RF.

In FIG. 4, the antennae ANT 1 and ANT 2 are for dual use, i.e. transmission and reception as well. The controller 36 can comprise a diversity switch in order to enable the dual use, carrier aggregation use, or multi modem use.

The controller 36 may be a separate component of the user equipment UE. However, it also may be integral with at least one of the Modem BB, the RFIC, the PMIC, the vehicle controller unit, and the memory module 38. Controls and control information may be originated by one or more of the before-mentioned components.

Further referring to FIG. 1, user equipment modem data path controlling with switching uplink (UL)/downlink (DL) diversity antennae ANT 1, ANT 2 will now be described in more detail. When the transmission path TX is switched to alternate antenna there is also impact to reception links, reception paths, respectively (RX). Switching may impact a data reception throughput/data connection when the common connection of the transmitter 24 in combination with the first diversity receiver 34, and the connection of the second diversity receiver 26 are swapped with respect to the connections of the antennae ANT 1 and ANT 2. Furthermore, a reception problem can arise from the fact that reception signal levels in the different antennae may vary with side mirror antennas ANT 1 and ANT 2, which have directivity to different directions. An improved controlling is desired to maintain the data reception throughput/connection reliability.

The problem is not only relevant to the automobile environment but also to different user case scenarios that cause reception performance problems. Switching timing selection with RF FE DPDT switch implementation may a need to account for breaks in the RX and/or TX data stream of FDD and/or TDD radio communication systems, or simply perform brutal switching when needed.

If the transmission path TX is switched alone between the antennae ANT 1 and ANT 2, a main RX modem, namely, diversity receiver 34, and a diversity RX modem of the diversity receiver 26 reception will not be impacted. However, this embodiment suffers from a high TX insertion loss, cost due to duplicated front end, and an extra (research and development) R&D platform hardware (HW) work.

Embodiments allow corresponding improvements by providing a control algorithm to be implemented with switching UL/DL diversity antennae.

By way of a recap of the foregoing, the user equipment UE comprises the apparatus 32 having the controller 36. The controller 36 provides for switching, for which purpose it may include or it may be connected to a switch unit 28. Additionally, the user equipment UE includes the two antennae ANT 1, ANT 2. Moreover, the user equipment UE includes the transmitter 24, the first diversity receiver 34 and the second diversity receiver 26. In an alternate embodiment, the user equipment UE may include further alternate transmitters, receivers, modems and antennae. The antennae ANT 1, ANT 2 as well as the transmitter 24, the first diversity receiver 34 and the second diversity receiver 26 are connected with the switch unit 28 via connections. The switch unit 28 is interconnected between the transmitter 24, the first diversity receiver 34 and the second diversity receiver 26, on the one hand, and the two antennae ANT 1, ANT 2, on the other hand. The switch unit 28 causes the transmitter 24 to be switchably connected with one of the two antennae ANT 1, ANT 2 together with the first diversity receiver 34, and the second diversity receiver 26 to be switchably connected with another one of the two antennae ANT 1, ANT 2. The controller 36 causes the switch unit 28 to provide for connection between the transmitter 24 and the first diversity receiver 34 and one antenna of the two antennae ANT 1, ANT 2. Moreover, connection between the second diversity receiver 26 and another one of the two antennae ANT 1, ANT 2 is provided.

The controller 36 is configured to control the transmitter 24 and at least two diversity receivers 34, 26, wherein the first antenna ANT 1 is assigned to said transmitter 24 and the first diversity receiver 34 and the respective second antenna ANT 2 is assigned to the respective second diversity receiver 26. The controller 36 is further configured to receive at least two diversity reception signals, evaluate a communication link between said apparatus 32 and a communication counterpart, and, based on the evaluation of the communication link, decide that the transmitter 24 needs to be configured to transmit via the second diversity antenna ANT 2. Further, the controller 36 is arranged to obtain e.g. detect, reception parameters that may include channel interference parameters used by said at least two diversity receivers 34, 26, switch the transmitter 24 to transmit via the second antenna ANT 2, and exchange reception parameters that may include channel interference parameters between the at least two diversity receivers 34, 26. The controller 36 can be further connected with the memory module 38 so that data such as the parameters can be stored in or retrieved from the memory module 38.

The user equipment UE has a communication link with at least one counterpart as e.g. a base station (BTS) via the antenna system comprising the antennae ANT 1 and ANT 2. In some communication embodiment, the user equipment UE may have a communication link with two or more communication counterparts such as e. g. base stations (BTS). Antenna selection criteria can also take account to alternate transmitter communication link quality.

In an alternate embodiment that employs MIMO, the diversity receivers 26, 34 can both be provided as MIMO receivers.

According to another exemplary embodiment, the apparatus 32, which may be for use in a mobile device, comprises a switch unit 28 configured to switch a common connection of a transmitter 24 and a first diversity/MIMO receiver 34 from a first antenna ANT 1 to a second antenna ANT 2 and a connection of a respective second diversity/MIMO receiver 26 from the second antenna ANT 2 to the first antenna ANT 1. Preferably, each of the antennae ANT 1 and ANT 2 is also connected with the switch unit 28 via corresponding antenna connection. The apparatus 32 further comprises a processing system, such as the controller 36 which may also be a circuitry, configured to control switching of the switch unit 28, receive at least two diversity reception/MIMO signals from the first and the second diversity/MIMO receivers 34, 26, in response to receipt of the at least two diversity reception/MIMO signals, evaluate a communication link via the first and the second antennae ANT 1, ANT 2 and, based on the evaluation of the communication link, decide that the transmitter 24 needs to transmit via the second antenna ANT 2. The controller 36 is arranged to obtain, e.g. detect, reception parameters that may include channel interference parameters used by said first and said second diversity/MIMO receivers 34, 26, cause the switch unit 28 to switch the common connection of the transmitter 24 and the first diversity/MIMO receiver 34 so that the transmitter 24 transmits via the second antenna ANT 2, and exchange reception parameters that may include channel interference parameters between the at least two diversity/MIMO receivers 34, 26. Preferably, switching of the common connection and the connection of the second diversity/MIMO receiver 26 is provided simultaneously as may be realized by a DPDT switch unit 28.

According to another exemplary embodiment, the apparatus 32 is additionally provided with a processing system that is configured to adjust at least one of the reception parameters. The processing system may be integral with the controller 36 or it may be established by a hardware circuitry, a combination of the controller 36 and a hardware circuitry, or the like. This embodiment allows adjustment of at least one of the reception parameters due to implementation and performance differences, e. g. when attenuation, phase, and/or delay due to cabling, filtering and/or switching to different antennae ANT 1, ANT 2 is different. In such cases, such known differences can be taken into account when making the parameter exchange. Preferably, a certain predefined parameter offset can be taken into account when exchanging the at least one reception parameter, and, based thereon, one or more parameters may be adjusted related to switching. Adjustment of the at least one reception parameter can be provided just before swap of the antennae ANT 1, ANT 2 or just after.

Preferably, the processing system, which may be embodied by the controller 36, is configured to provide adjustment of the at least one of the reception parameters during switching of the switch unit 28. For this purpose, the adjustment can be triggered by a signal causing the switch unit 28 to switch.

This allows the processing system to take account of e.g. attenuation due to differences in cabling to different antennae. Moreover, there may be implementation differences in filtering and/or switching arrangements between the two antenna signal paths. Adjusting the at least one reception parameter during switching of the switch unit 28 allows the at least two diversity/MIMO receivers 34, 26 to continue their receiving operation substantially without interruption because the parameter exchange including the adjustment can set the at least two diversity/MIMO receivers 34, 26 in a condition to directly proceed operating without requiring further adaptation. So, certain predefined parameter offsets can be immediately considered and thereby provide a proper operation.

In order to enable the at least one of the reception parameters to be adjusted during switching of the switch unit 28, one or more values related to adjustment of the at least one of the receiving parameters may be stored and/or predefined in advance. In this way a wide range of adjustments can be achieved. The values may be received by measurement and may be amended if necessary, e. g. because attenuation of a connection alters or the like.

According to an exemplary aspect and referring to FIG. 2, the operation can be as follows:

At step S10, the user equipment UE receives at least two radio wave signals. Reception is preferably established over the two antennae ANT 1, ANT 2. The TX path is established via the antenna ANT 1.

The user equipment UE detects at step S12 a need to swap the TX path from the antenna ANT 1 to the antenna ANT 2. Then, the control module 36 obtains, preferably detects, reception conditions, or parameters, respectively, in radio waves signal reception at step S14. In order to provide such information, the control module 36 records the parameters needed such as analog and digital controlling parameters 42, 44 or the like, related to both of the antennae ANT 1, ANT 2, or diversity/MIMO receivers 26, 34, respectively. For this purpose, the control module 36 may record such parameters from both the main receiver (or main RX modem 34) and the alternate diversity/MIMO receiver (or alternate diversity/MIMO RX modem 26) related to radio waves reception.

Thereafter, the recorded data, which may be stored in the memory module 38, are processed by the controller 36 so that UL antenna selection can be controlled thereon at step S16. An alternative implementation could be that the data is recorded all the time and it is used for antenna switching when a need for the recorded data is detected.

Then, the user equipment UE, especially, the controller 36, switches the recorded parameters between the main diversity/MIMO receiver 34 and the diversity/MIMO receiver 26 at step S18.

Additionally, according to an exemplary aspect, the signal paths and both modem paths are switched by the switch unit 28 controlled by the controller 36.

So, operation of the first diversity receiver 34 and the second diversity receiver 26 can be continued substantially without data throughput reception losses at step S20. Data reception in each receiver modem can continue with controlling parameters of the corresponding alternate modem. This procedure can be repeated anytime. Once switching is complete, receiving of the at least two signals with the first and second receivers, which may be diversity/MIMO receivers, is continued. Preferably, the step of receiving the at least two signals continues immediately, without substantive delay. In an alternative exemplary embodiment, the analog and digital reception parameters and/or channel interference parameters may be stored in the memory module at any time during reception. Further, step S14 can be performed before step S12, thereby switching the order of these steps. When a need is detected to switch the UL antenna, these parameters are ready to be used for the antenna selection process as described in steps S16 to S20.

Figure 2:
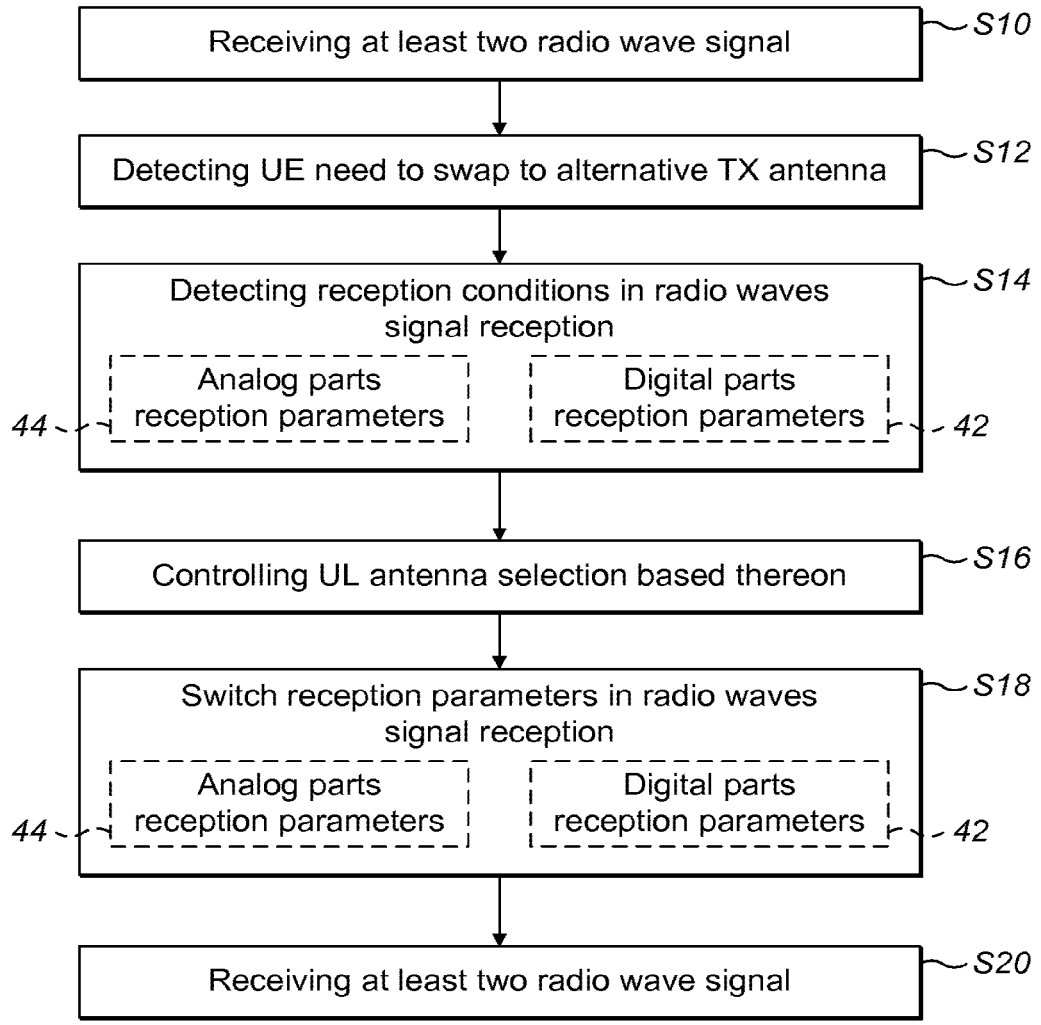
FIG. 2 schematically depicts a flow chart of a first process for switching the transceiver and the receiver.
Figure 3:
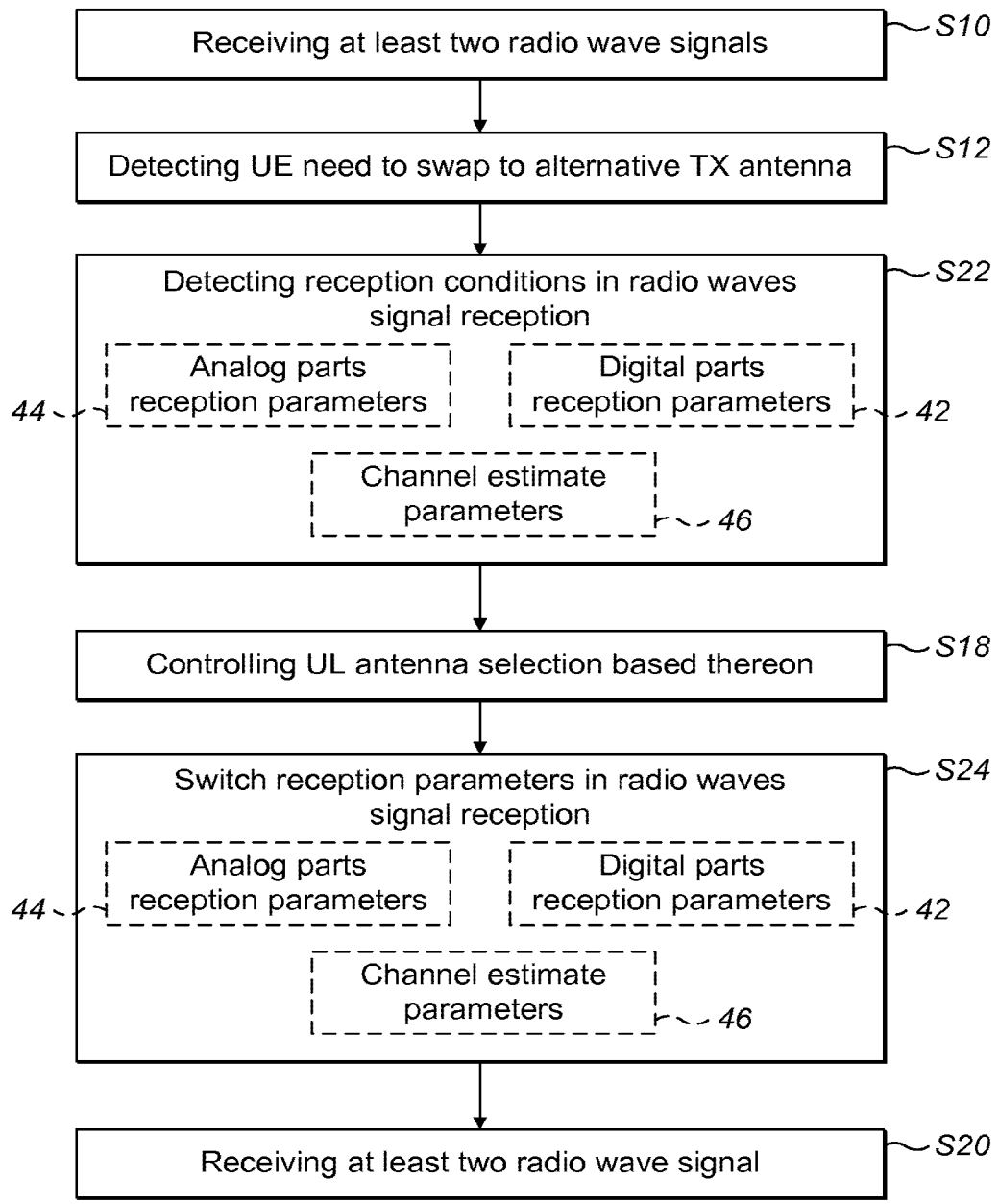
FIG. 3 schematically depicts a flow chart of a second process for switching the transceiver and the receiver.

A further exemplary embodiment is schematically depicted by the flow chart according to FIG. 3. Since this embodiment employs a similar operation as the embodiment according to FIG. 2, only the differences are detailed in the following.

The embodiment according to FIG. 3 includes the steps S10 and S12 as of the embodiment according to FIG. 2. This is followed by step S22, wherein the control module 36 obtains, preferably detects, reception conditions, or parameters, respectively, radio waves signal reception. In order to provide such information, the controller 36 records parameters needed such as channel estimate parameters 46, analog and digital controlling parameters 42, 44 or the like, related to both of the antennae ANT 1, ANT 2 or the first and the second diversity receivers 34, 26, respectively.

This step is followed by step S16 according to the embodiment of FIG. 2.

Differing from the previous embodiment, at step S22, the user equipment UE, especially, the controller 36, switches the recorded parameters between the main diversity receiver 34 and the diversity receiver 26, wherein not only the analog and digital controlling parameters 42, 44 are switched but also the channel estimate parameters 46.

As for the exemplary embodiment according to FIG. 2, the embodiment according to FIG. 3 may be modified so that step S22 is performed before step S12. The reception conditions may be obtained at any time and they can thus be readily stored in memory for use when a need of swapping the UL antenna is detected. They can be obtained by detection or the like.

Other systems can also benefit from the principles presented herein as long as they have identical or similar properties such as mobile communication in any communication band.

Embodiments of the present invention may be used with FDD and TDD communication radio link, intra band carrier aggregation, inter band carrier aggregation, contiguous and non-contiguous carrier aggregation, or the like. Furthermore, the user equipment UE radio communication links may use the same or different radio communication protocol/system and may have communication link to same or different communication counterpart.

Embodiments of the present invention may be implemented in software, hardware, application logic or a combination of software, hardware and application logic. The software, application logic and/or hardware generally reside on control modules of terminal devices or network devices.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention can advantageously be implemented in user equipments or smart phones, or personal computers connectable to such networks. That is, it can be implemented as/in chipsets to connected devices, and/or modems thereof.

As used in this application, the terms "unit", "module", "processing system", and "circuitry" refer to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition applies to all uses of those terms in this application, including in any claims.

As a further example, as used in this application, the terms "unit", "module", "processing system", and "circuitry" would also cover an implementation of merely a processor (or multiple processors) or portion of a processor and its (or their) accompanying software and/or firmware. The terms "unit", "module", "processing system", and "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

LIST OF ACRONYMS

LTE: Long Term Evolution
LTE-A: LTE Advanced
UE: user equipment
UMTS: Universal Mobile Telecommunications System
GSM: Global System for Mobile Communications
DL: downlink
UL: uplink
TX: transmitting signal, transmission link, transmission path
RX: receiving signal, reception link, reception path
MIMO: Multiple Input Multiple Output
FE: Front End
BB: baseband
MIMO: Multiple Input Multiple Output
FE: Front End
DPDT: double pole double throw

The invention claimed is:

1. An apparatus for use in a mobile device, the apparatus comprising:
    a switch configured to switch a transceiver including a transmitter and a first receiver from a first antenna to a second antenna and switch a connection of a second receiver from the second antenna to the first antenna; and
    at least one processor configured to
        receive at least two reception signals from the first and the second receivers;
        in response to receiving the at least two reception signals, detect at least one channel interference parameter for each of the first antenna and the second antenna;
        determine, based on the at least one channel interference parameter, that the transmitter is to transmit via the second antenna;
        in response to a determination that the transmitter is to transmit via the second antenna, exchange the at least one channel interference parameter detected for each of the first antenna and the second antenna between the transceiver and the second receiver; and
        control the switch to switch the transceiver so that the transmitter transmits via the second antenna and to switch the connection of the second receiver from the second antenna to the first antenna.

2. The apparatus according to claim 1, wherein the detected at least one channel interference parameter includes a downlink analog parts reception parameter or a downlink digital parts reception parameter.

3. The apparatus according to claim 1, wherein the detected at least one channel interference parameter includes at least one channel estimation parameter.

4. The apparatus according to claim 1, wherein the determination that the transmitter is to transmit via the second antenna is made based on the at least one channel interference parameter detected for each of the first antenna and the second antenna.

5. The apparatus according to claim 4, wherein the at least one processor is further configured to adjust at least one of the channel interference parameters detected for each of the first antenna and the second antenna during switching of the switch.

6. The apparatus according to claim 1, wherein the mobile device is a vehicle and the first antenna and the second antenna are positioned on opposite sides of the vehicle.

7. A method for switching a transceiver including a transmitter and a first receiver, the method comprising:
    receiving at least two reception signals from the first receiver and a second receiver;
    in response to receiving the at least two reception signals, detecting at least one channel interference parameter for each of a first antenna and a second antenna;
    determining, based on the at least one channel interference parameter, that the transmitter is to transmit via the second antenna;
    in response to a determination that the transmitter is to transmit via the second antenna, exchanging the at least one channel interference parameter detected for each of the first antenna and the second antenna between the transceiver and the second receiver; and controlling a switch to switch the transceiver so that the transmitter transmits via the second antenna and to switch a connection of the second receiver from the second antenna to the first antenna.

8. The method according to claim 7, wherein the detected at least one channel interference parameter includes a downlink analog parts reception parameter or a downlink digital parts reception parameter.

9. The method according to claim 7, wherein the detected at least one channel interference parameter includes at least one channel estimation parameter.

10. The method according to claim 7, wherein the determination that the transmitter is to transmit via the second antenna is made based on the at least one channel interference parameter detected for each of the first antenna and the second antenna.

11. The method according to claim 10, wherein method further comprises adjusting at least one of the channel interference parameters detected for each of the first antenna and the second antenna during switching of the switch.

12. The method according to claim 7, wherein the mobile device is a vehicle and the first antenna and the second antenna are positioned on opposite sides of the vehicle.

13. A non-transitory computer-readable storage medium comprising a set of computer-readable instructions stored thereon, which, when executed by a device, cause the device to perforin a method for switching a transceiver including a transmitter and a first receiver, the method comprising:

receiving at least two reception signals from the first receiver and a second receiver;

in response to receiving the at least two reception signals, detecting at least one channel interference parameter for each of a first antenna and a second antenna;

determining, based on the at least one channel interference parameter, that the transmitter is to transmit via the second antenna;

in response to a determination that the transmitter is to transmit via the second antenna, exchanging the at least one channel interference parameter detected for each of the first antenna and the second antenna between the transceiver and the second receiver; and controlling the switch to switch the transceiver so that the transmitter transmits via the second antenna and to switch a connection of the second receiver from the second antenna to the first antenna.

14. The non-transitory computer-readable storage medium according to claim 13, wherein the detected at least one channel interference parameter includes a downlink analog parts reception parameter or a downlink digital parts reception parameter.

15. The non-transitory computer-readable storage medium according to claim 13, wherein the detected at least one channel interference parameter includes at least one channel estimation parameter.

16. The non-transitory computer-readable storage medium according to claim 13, wherein the determination that the transmitter is to transmit via the second antenna is made based on the at least one channel interference parameter detected for each of the first antenna and the second antenna.

17. The non-transitory computer-readable storage medium according to claim 16, wherein method further comprises adjusting at least one of the channel interference parameters detected for each of the first antenna and the second antenna during switching of the switch.

18. The non-transitory computer-readable storage medium according to claim 13, wherein the mobile device is a vehicle and the first antenna and the second antenna are positioned on opposite sides of the vehicle.

* * * * *